United States Patent
Titoruk et al.

(10) Patent No.: US 12,481,835 B1
(45) Date of Patent: Nov. 25, 2025

(54) CHARACTER TURN SUMMARIES

(71) Applicant: Character Technologies Inc., Palo Alto, CA (US)

(72) Inventors: Denis Titoruk, Sunnyvale, CA (US); Jonathan Michael Abrams, San Mateo, CA (US); James Douglas Groeneveld, San Francisco, CA (US)

(73) Assignee: Character Technologies Inc., Palo Alto, CA (US)

( * ) Notice: Subject to any disclaimer, the term of this patent is extended or adjusted under 35 U.S.C. 154(b) by 0 days.

(21) Appl. No.: 19/084,517

(22) Filed: Mar. 19, 2025

(51) Int. Cl.
*G06F 40/35* (2020.01)

(52) U.S. Cl.
CPC ................... *G06F 40/35* (2020.01)

(58) Field of Classification Search
CPC ....................................................... G06F 40/35
See application file for complete search history.

(56) References Cited

U.S. PATENT DOCUMENTS

| | | | |
|---|---|---|---|
| 6,477,534 B1 * | 11/2002 | Acharya | G06F 16/24556 707/999.005 |
| 8,239,358 B1 * | 8/2012 | Soubbotin | G06F 16/338 707/726 |
| 11,604,789 B1 * | 3/2023 | Cannon | G06F 40/30 |
| 11,615,231 B1 * | 3/2023 | Peck | G06F 40/205 715/269 |
| 12,061,970 B1 * | 8/2024 | Lo | G06N 20/00 |
| 2007/0299804 A1 * | 12/2007 | Liu | G06F 16/2471 |
| 2010/0217592 A1 * | 8/2010 | Gupta | G06F 40/35 704/236 |
| 2019/0129942 A1 * | 5/2019 | Seuss | G06F 40/56 |
| 2020/0097535 A1 * | 3/2020 | Rychlewski | G06F 40/169 |
| 2022/0108086 A1 * | 4/2022 | Wu | G06F 40/35 |
| 2022/0156460 A1 * | 5/2022 | Láinez Rodrigo | G06Q 30/02 |
| 2023/0092702 A1 * | 3/2023 | Mao | G10L 15/20 704/9 |
| 2023/0394226 A1 * | 12/2023 | Medalion | G06F 40/166 |
| 2024/0354436 A1 * | 10/2024 | Mukherjee | G06F 16/3344 |
| 2024/0403540 A1 * | 12/2024 | Benedetto | H04L 51/216 |
| 2024/0403551 A1 * | 12/2024 | Berglund | G06F 40/20 |
| 2025/0094716 A1 * | 3/2025 | Wang | G06F 40/216 |

\* cited by examiner

*Primary Examiner* — Eric Yen

(74) *Attorney, Agent, or Firm* — Van Pelt, Yi & James LLP (57) ABSTRACT

A history of conversation turns is obtained. A prompt and the history of conversation turns is provided to an artificial intelligence language model. The history of conversation turns includes one or more summaries summarizing a plurality of the conversation turns. A response is received from the AI language model.

19 Claims, 7 Drawing Sheets

CHARACTER TURN SUMMARIES

BACKGROUND OF THE INVENTION

It is important for an artificial intelligence (AI) agent to be able to recall the content of what was discussed throughout a conversation. However, an AI agent's memory is limited by the size of the underlying large language model's (LLM) context window. The context window represents the amount of text data that the LLM can process when generating responses. Once a conversation's length exceeds the size of the context window, early messages become out of scope, and the LLM cannot process the necessary information in its response. A larger context window is a viable solution, but the size of the context window can only be increased with advances in LLM technology.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Systems and methods of generating character turn summaries in an AI agent conversation are disclosed. To avoid exceeding the length of an LLM context window and losing important information from the beginning of an AI agent conversation, systems and methods for condensing the message turn history is needed. Furthermore, higher level summaries are needed to further condense the information in the summaries to avoid a plurality of summaries exceeding the context window.

Generating character turn summaries in an AI agent conversation includes storing a history of turns taken between a client device and an AI agent, or character, in a database. In response to determining that the conversation length has exceeded a threshold, a summary of the conversation is generated and stored. In some embodiments, the summary includes text associated with a threshold number of turns. In some embodiments, the summary includes text associated with a threshold number of tokens. A plurality of summaries may be generated and stored.

In response to determining that the length of the plurality of summaries has exceeded a threshold, a higher-level condensed summary of the summaries is generated and stored. A plurality of condensed summaries of summaries may be generated and stored.

This process may be similarly repeated whenever the length of the summaries on any given level exceeds a threshold, thereby generating and storing multiple levels of turn summaries based on the conversation history. The systems and methods disclosed herein enable the inclusion of important information in a conversation's turn history to fit within the context window.

Figure 1:
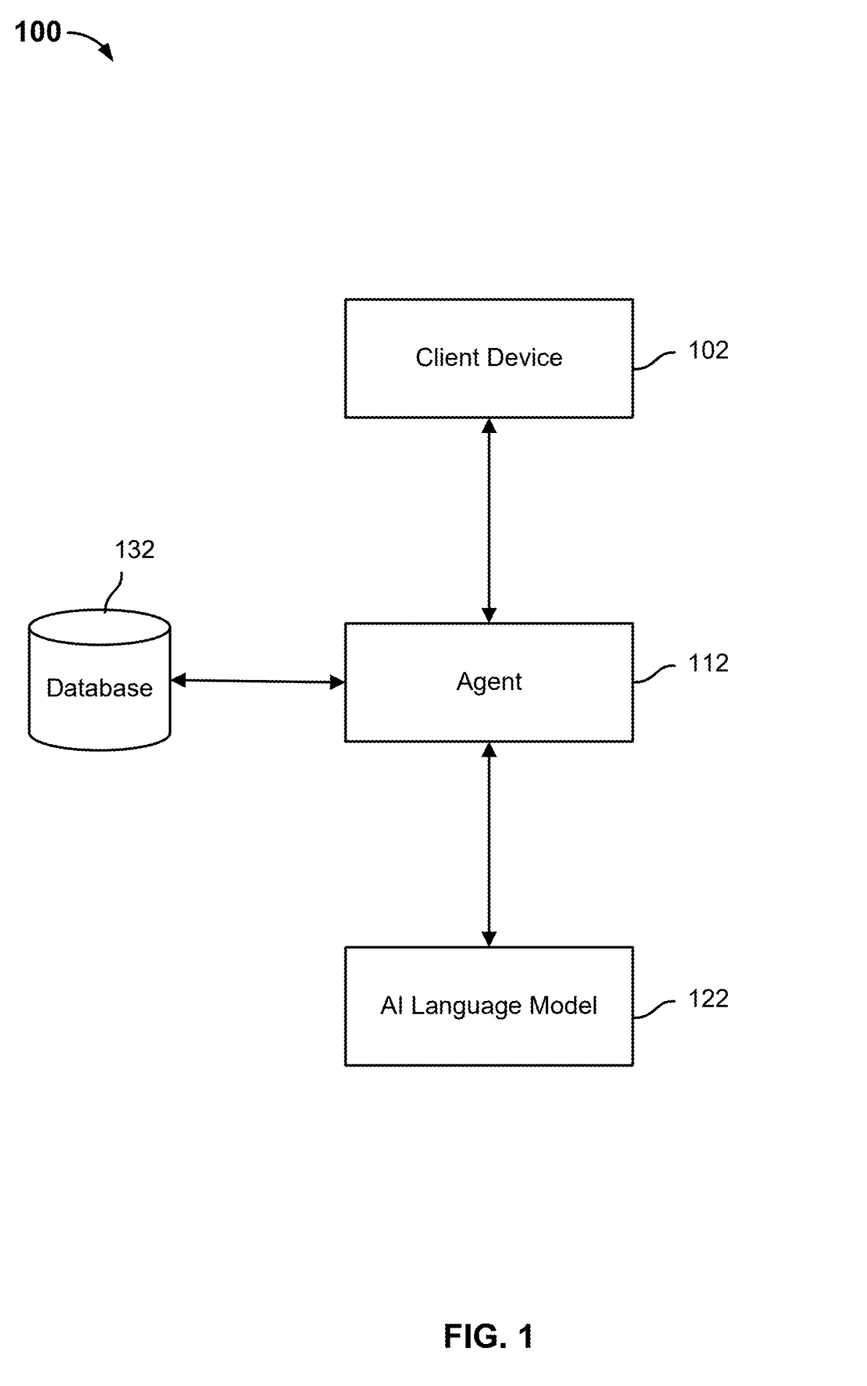
FIG. 1 is a block diagram illustrating an embodiment of a system for generating multi-level summaries in an AI agent conversation.

FIG. 1 is a block diagram illustrating an embodiment of a system for generating multi-level summaries in an AI agent conversation. In the example shown, system 100 includes client device 102, agent 112, AI language model 122, and database 132. Client device 102 may be a computer, a smartphone, a laptop, a tablet, a smartwatch, or any other electronic device capable of communicating with external parties over a network.

Client device 102 is configured to communicate with agent 112 over a network. In some embodiments, agent 112 corresponds to an automated chatbot. In some embodiments, the automated chatbot corresponds to a particular character. In some embodiments, communication between client device 102 and agent 112 is performed on a chat interface on a website. In some embodiments, the chat interface is an application installed on client device 102. Client device 102 may provide text and/or other data (e.g., audio, video, image, etc.) to agent 112 in a conversation turn.

Agent 112 is configured to utilize AI language model 122 when generating a response (i.e., a turn in a conversation). AI language model 122 may be an LLM. In generating conversation turns, agent 112 provides information about the conversation history to AI language model 122. In some embodiments, the information about the conversation history is constructed as multi-level summaries of the conversation history.

Figure 2:
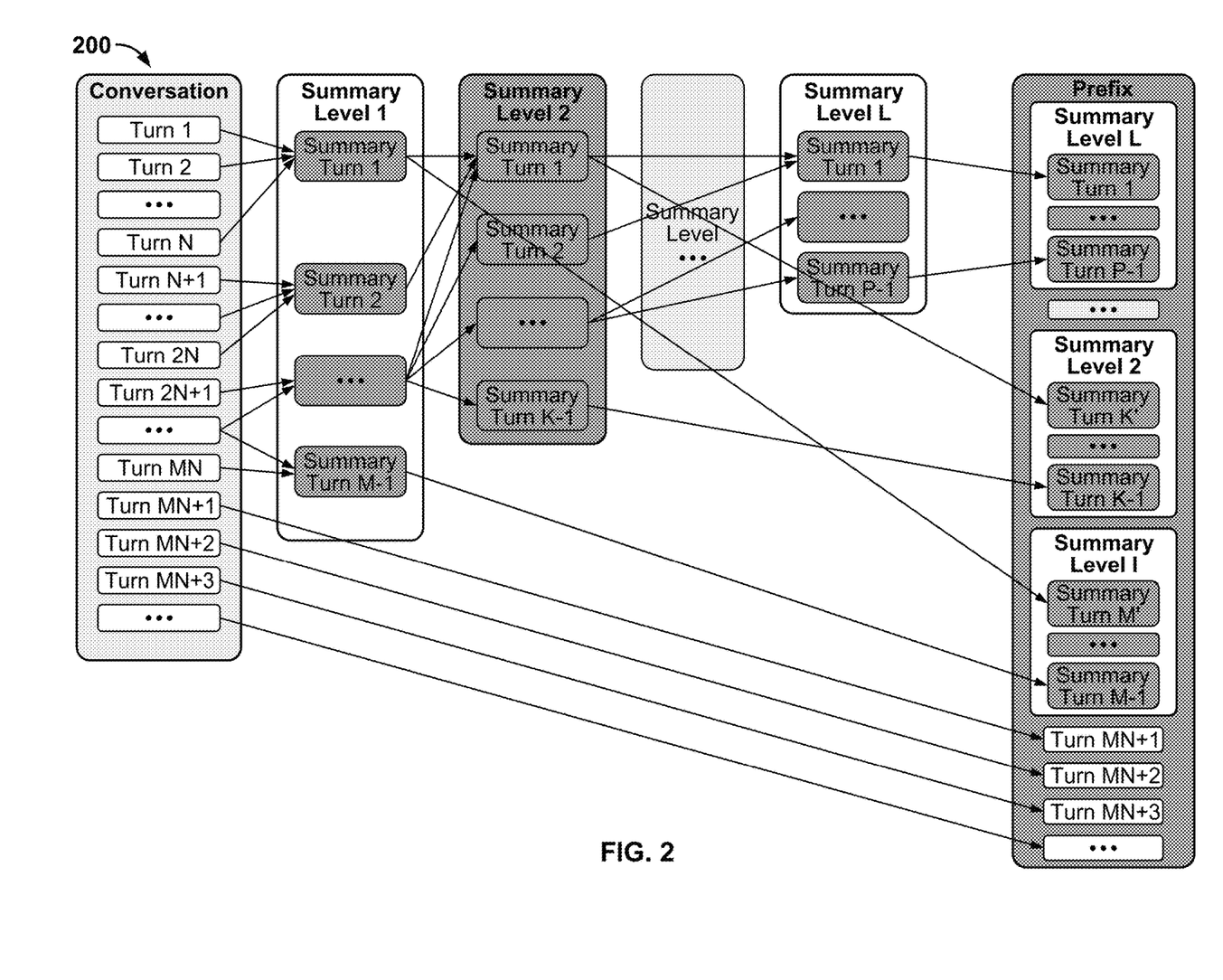
FIG. 2 provides an example of a plurality of summary levels and a resulting prefix based on an AI agent conversation.

FIG. 2 provides an example of a plurality of summary levels and a resulting prefix based on an AI agent conversation. Each level consists of a plurality of summaries based on condensing the information from turns in the previous level. For example, summary level 1 includes a plurality of summaries where each summary is based on condensing the information from a certain number of turns in a conversation history. Furthermore, summary level 2 includes a plurality of summaries where each summary is based on condensing the information from a certain number of summaries in summary level 1, summary level 3 includes a plurality of summaries where each summary is based on condensing the information from a certain number of summaries in summary level 2, and so on.

The information from the conversation and the resulting levels of summaries may be combined into a resulting prefix. In the example shown, the prefix contains the summaries from levels 1:L, where level 1 summaries summarize the history of conversation turns and levels 2:L are condensed summaries of summaries. The prefix also includes non-summarized conversation turns MN+1, MN+2, and so on, representing the most recent turns of the conversation history.

The prefix is maintained separately and represents an overall state of the conversation summaries. The prefix may therefore serve as contextual information about the history of the conversation. In some embodiments, the prefix is provided by agent 112 to AI language model 122 as part of a prompt. The prompt may also include additional instructions for how to generate a response.

In some embodiments, the prompt includes a threshold number of turns or a threshold number of summaries along with an instruction to generate a summary that condenses the information.

AI language model 122 generates a response based on the prompt. In some embodiments, the response is provided back to agent 112.

In some embodiments, the response is stored in database 132. Database 132 is configured to store information about the conversation including the conversation turn history and multiple levels of summaries, each condensing the information found in the previous level.

Database 132 may provide information about the conversation to agent 112. In some embodiments, agent 112 provides information from client device 102 to be stored in database 132.

Figure 3:
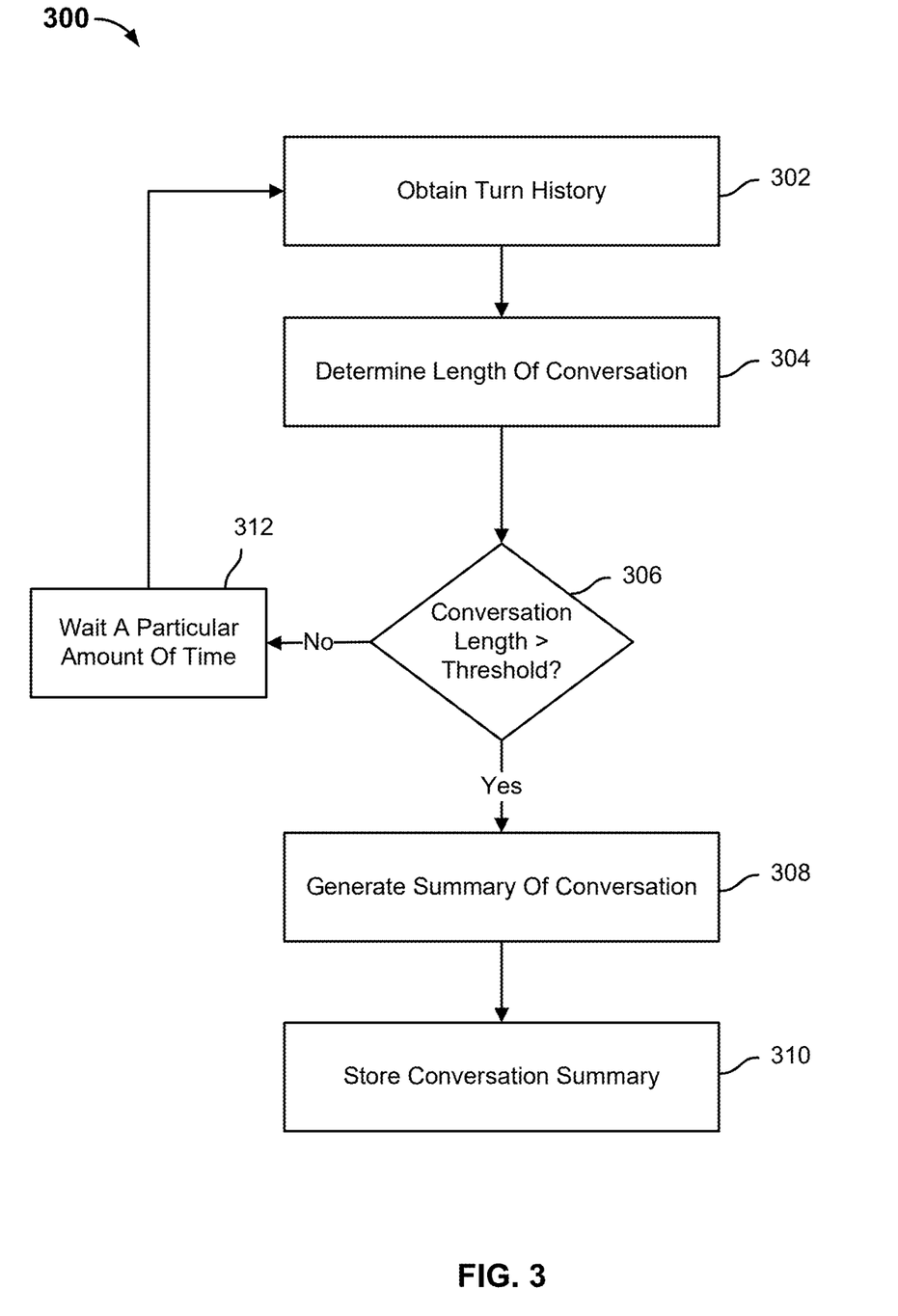
FIG. 3 is a flow diagram illustrating a process for generating and storing a conversation summary based on a history of turns in the conversation in accordance with some embodiments.

FIG. 3 is a flow diagram illustrating a process for generating and storing a conversation summary based on a history of turns in the conversation in accordance with some embodiments. In the example shown, process 300 may be implemented by an agent, such as agent 112.

At 302, conversation turn history is obtained. The turn history may be obtained from a database such as database 132.

At 304, the length of the conversation is determined.

At 306, it is determined whether the conversation length is greater than a threshold. In some embodiments, the threshold is a certain number of tokens. In some embodiments, the threshold is a certain number of messages.

The threshold is pre-determined based on the context window of the AI language model, such as AI language model 122, used to generate responses in the conversation.

In response to a determination that the conversation length is not greater than the threshold, process 300 proceeds to 312.

In response to a determination that the conversation length is greater than the threshold, process 300 proceeds to 308.

At 308, a summary of a plurality of conversation turns is generated. The summary is based on the conversation prior to the conversation length reaching the threshold. The summary may be generated by prompting a LLM with the plurality of conversation turns and an instruction to generate a summary (e.g., "summarize the conversation history"). The summary of the plurality of conversation turns is generated as a background process. The conversation may include one or more additional conversation turns that occurred after the conversation length reached the threshold.

At 310, the conversation summary is stored in a database such as database 132.

At 312, after waiting a particular amount of time, process 300 returns to 302.

Figure 4:
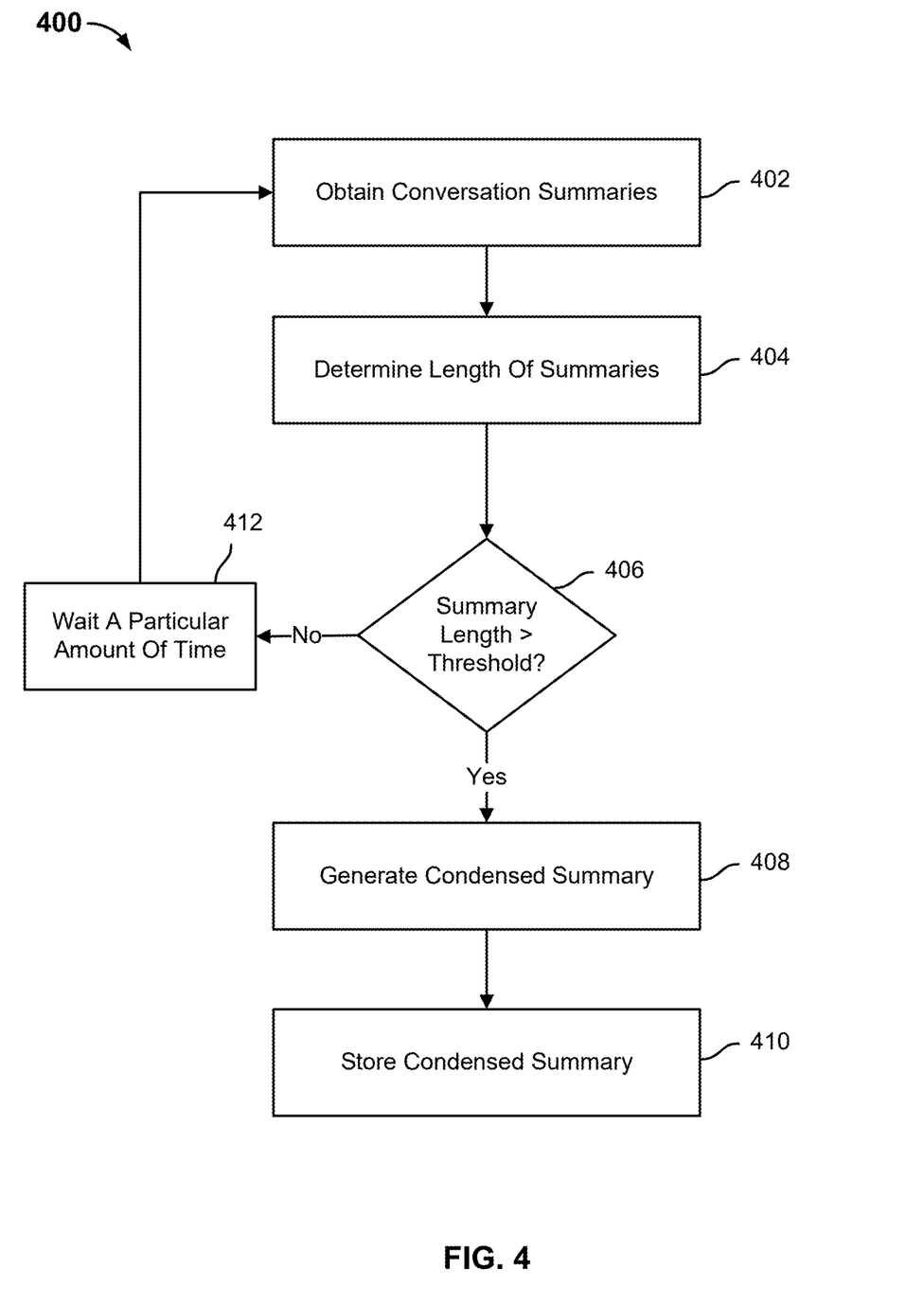
FIG. 4 is a flow diagram illustrating a process for generating and storing a condensed summary based on stored conversation summaries in accordance with some embodiments.

FIG. 4 is a flow diagram illustrating a process for generating and storing a condensed summary based on stored conversation summaries in accordance with some embodiments. In the example shown, process 400 may be implemented by an agent, such as agent 112.

At 402, stored conversation summaries are obtained. The stored conversation summaries may be obtained from a database such as database 132. The stored conversation summaries may be conversation summaries generated and stored by a process such as process 300.

At 404, the length of the conversation summaries is determined.

At 406, it is determined whether the length of the summaries is greater than a threshold. In some embodiments, the threshold is a certain number of tokens. In some embodiments, the threshold is a certain number of messages.

The threshold is pre-determined based on the context window of the AI language model, such as AI language model 122, used to generate responses in the conversation.

In response to a determination that the length of the summaries is not greater than the threshold, process 400 proceeds to 412.

In response to a determination that the length of the summaries is greater than the threshold, process 400 proceeds to 408.

At 408, a condensed summary of a plurality of conversation summaries is generated. The summary is based on the conversation summaries prior to the conversation summaries length reaching the threshold. The condensed summary may be generated by prompting a LLM with the plurality of conversation summaries and an instruction to generate a summary (e.g., "summarize the conversation summaries"). The condensed summary of the plurality of conversation summaries is generated as a background process. The list of conversation summaries may include one or more additional conversation summaries that occurred after the conversation summaries length reached the threshold.

At 410, the condensed summary is stored in a database such as database 132.

At 412, after waiting a particular amount of time, process 400 returns to 402.

Figure 5:
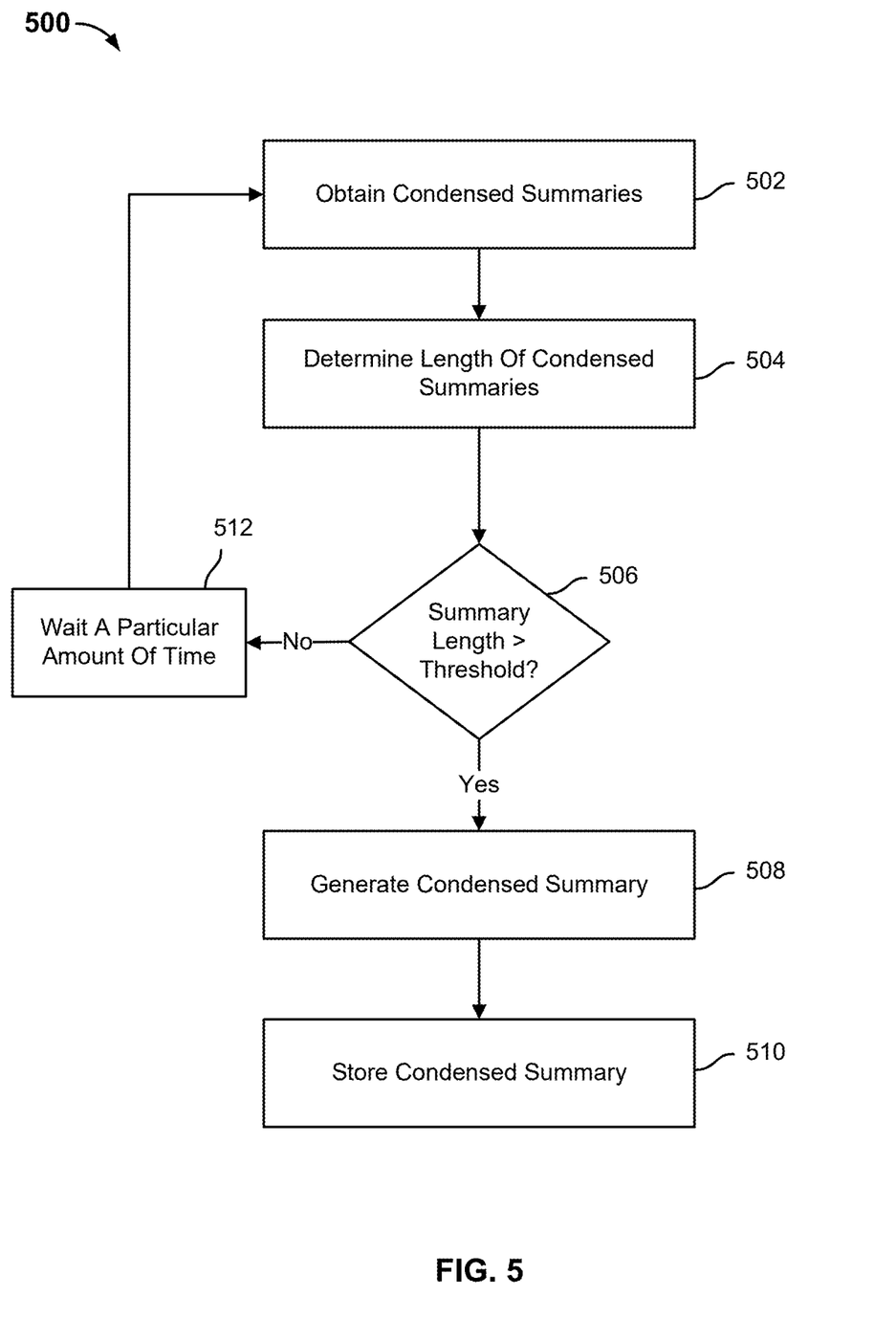
FIG. 5 is a flow diagram illustrating a process for generating and storing a condensed summary based on previously stored condensed summaries in accordance with some embodiments.

FIG. 5 is a flow diagram illustrating a process for generating and storing a condensed summary based on previously stored condensed summaries in accordance with some embodiments. In the example shown, process 500 may be implemented by an agent, such as agent 112.

At 502, stored condensed summaries are obtained. The condensed summaries may be obtained from a database such as database 132. The condensed summaries may be condensed summaries generated by a process such as process 400.

At 504, the length of the condensed summaries is determined.

At 506, it is determined whether the length of the summaries is greater than a threshold. In some embodiments, the threshold is a certain number of tokens. In some embodiments, the threshold is a certain number of messages.

The threshold is pre-determined based on the context window of the AI language model, such as AI language model 122, used to generate responses in the conversation.

In response to a determination that the length of the summaries is not greater than the threshold, process 500 proceeds to 512.

In response to a determination that the length of the summaries is greater than the threshold, process 500 proceeds to 508.

At 508, a condensed summary of a plurality of condensed summaries is generated. The summary is based on the condensed summaries prior to the condensed summaries length reaching the threshold. The condensed summary may be generated by prompting a LLM with the plurality of condensed summaries and an instruction to generate a summary (e.g., "summarize the condensed summaries"). The condensed summary of the plurality of condensed summaries is generated as a background process. The list of condensed summaries may include one or more additional condensed summaries that occurred after the condensed summaries length reached the threshold.

At 510, the condensed summary is stored in a database such as database 132.

At 512, after waiting a particular amount of time, process 500 returns to 502.

Figure 6:
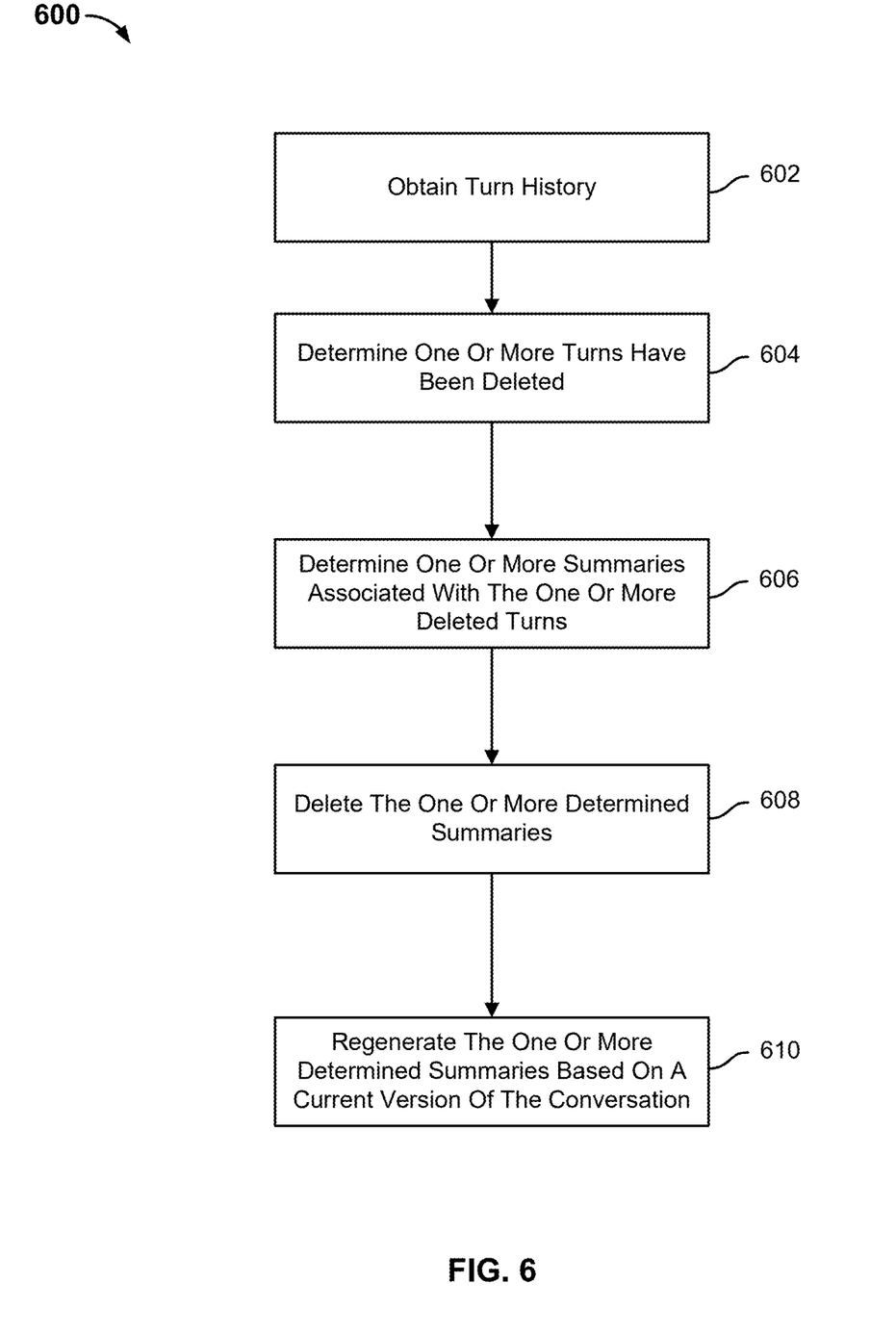
FIG. 6 is a flow diagram illustrating a process for regenerating summaries when a turn has been deleted in the conversation history in accordance with some embodiments.

FIG. 6 is a flow diagram illustrating a process for regenerating summaries when a turn has been deleted in the conversation history in accordance with some embodiments. In the example shown, process 600 may be implemented by an agent, such as agent 112.

At 602, conversation turn history is obtained. The turn history may be obtained from a database such as database 132.

At 604, it is determined that one or more turns have been deleted.

At 606, one or more summaries associated with the one or more deleted turns are determined. For example, at the first summary level, the summaries associated with the one or more deleted turns would be those that encompass the part of the conversation including the one or more deleted turns as well as later parts of the conversation, as well as higher level summaries associated with these determined summaries.

At 608, the summaries determined at 606 are deleted.

At 610, one or more summaries are regenerated based on a current version of the conversation (i.e., a version of the conversation that does not include the deleted turns determined at 604).

A conversation summary may be regenerated and stored through a process such as process 300. A condensed summary of conversation summaries may be regenerated and stored through a process such as process 400. A condensed summary of condensed summaries may be regenerated and stored through a process such as process 500.

Figure 7:
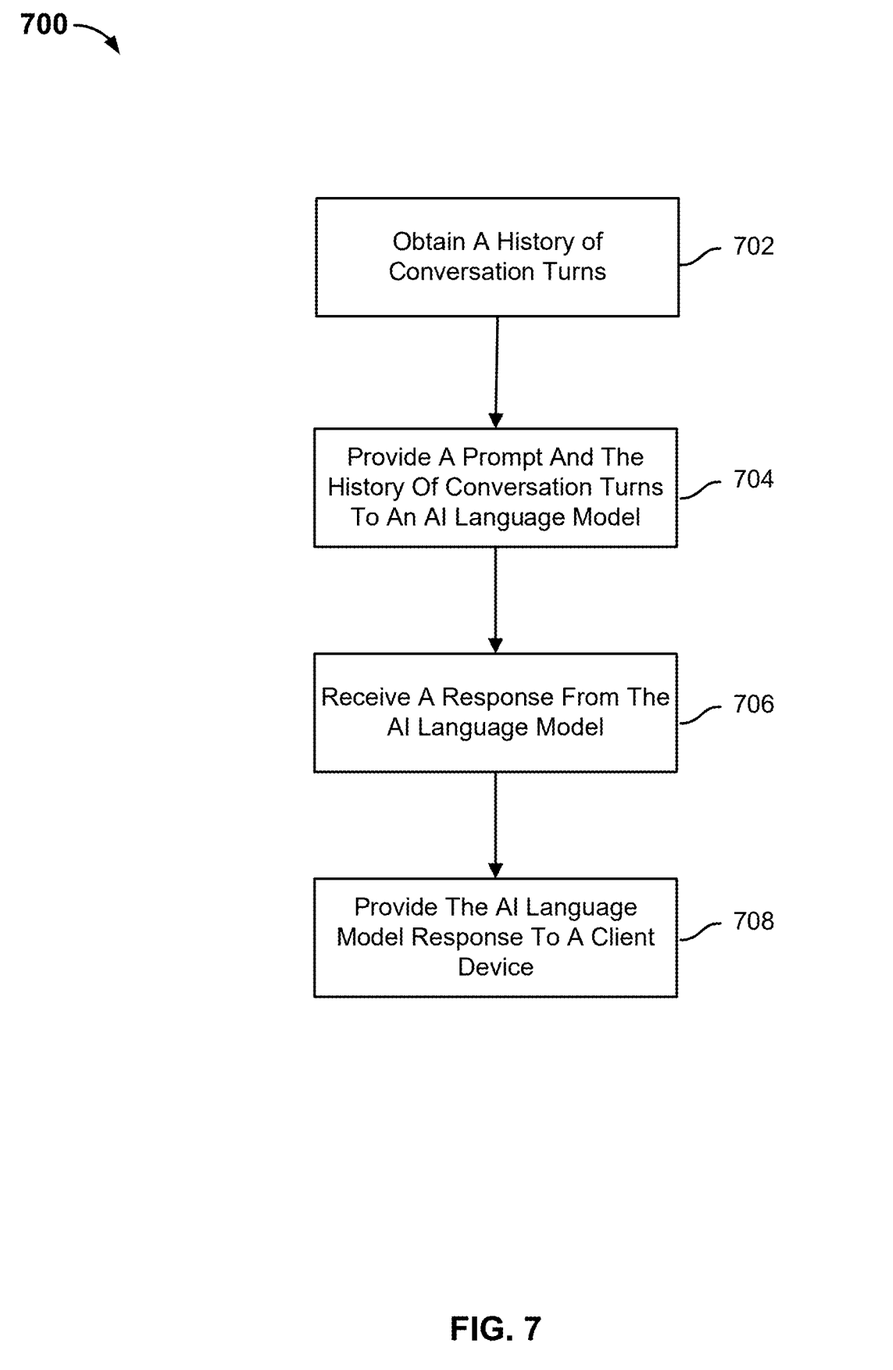
FIG. 7 is a flow diagram illustrating a process for receiving a response from an AI language model based on a history of conversation turns in accordance with some embodiments.

FIG. 7 is a flow diagram illustrating a process for receiving a response from an AI language model based on a history of conversation turns in accordance with some embodiments. In the example shown, process 700 may be implemented by an agent, such as AI agent 112.

An agent may implement process 700 in a conversation between a client device, such as client device 102, and an AI chatbot. In a conversation with an AI chatbot, the chatbot is expected to provide a response according to context about the history of conversation turns. Providing the response requires a LLM associated with the AI chatbot considering what was previously said in the conversation so that the response is relevant to the conversation and avoids hallucinations.

At 702, a history of conversation turns is obtained. The history of conversation turns may be obtained from a database such as database 132.

At 704, a prompt and the history of conversation turns is provided to an AI language model. The prompt may request the AI language model to provide a response based on the history of conversation turns. For example, the prompt may inform the AI language model that the user has entered "I'm tired" and request the AI language model to provide a response based on "I'm tired" and the history of conversation turns.

The history of conversation turns may include an entire conversation or a portion thereof (e.g., a portion of a conversation that has not been summarized), one or more conversation summary histories, one or more condensed summary histories, and/or a combination thereof. In some embodiments, some or all of the history of turns undergoes steps 304-308 of process 300, steps 404-408 of process 400, steps 504-508 of process 500, or step 610 of process 600 before being provided to the AI language model. Providing the history of turns to an AI language model may further include providing a prompt to the AI language models with instructions to generate a summary of the conversation turns, conversation summaries, condensed summaries, or a combination of the three, respectively.

At 706, a response is received from the AI language model. The response is the next turn in the user-AI chatbot conversation. For example, in response to "I'm tired," the AI language model response may be "we should turn back" or "let's rest for a couple of minutes." The AI language model response is based on what was previously said in the history of conversation turns so that the AI language model response makes sense.

At 708, the AI language model response is provided to the client device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    obtaining a history of conversation turns;
    providing to an artificial intelligence (AI) language model a prompt and the history of conversation turns, wherein the history of conversation turns includes one or more summaries summarizing a plurality of the conversation turns;

receiving a response from the AI language model;

determining one or more turns of the history of conversation turns have been deleted;

determining which of the one or more summaries are associated with the one or more deleted turns;

deleting the one or more determined summaries; and regenerating the one or more deleted summaries based on a current version of a conversation.

2. The method of claim 1, further comprising: providing the response from the AI language model to a client device.

3. The method of claim 1, further comprising determining a length of the history of conversation turns.

4. The method of claim 3, further comprising generating a summary of some or all of the conversation turns in response to determining that the length of the history of conversation turns is greater than a conversation threshold.

5. The method of claim 4, wherein the conversation threshold is a particular number of turns.

6. The method of claim 4, wherein the conversation threshold is a particular number of tokens.

7. The method of claim 1, wherein the history of conversation turns includes at least a first summary and a second summary.

8. The method of claim 7, further comprising determining a length of the first summary and the second summary.

9. The method of claim 8, further comprising generating a condensed summary of the first summary and second summary in response to determining that the length of the first summary and the second summary is greater than a summary threshold.

10. The method of claim 1, wherein the history of conversation turns includes at least a first condensed summary and a second condensed summary.

11. The method of claim 10, further comprising determining a length of the first condensed summary and the second condensed summary.

12. The method of claim 11, further comprising generating a condensed summary of the first condensed summary and second condensed summary in response to determining that the length of the first condensed summary and the second condensed summary is greater than a condensed summary threshold.

13. The method of claim 1, wherein the one or more summaries associated with the one or more deleted turns includes one or more condensed summaries.

14. The method of claim 1, wherein the one or more summaries associated with the one or more deleted turns includes one or more condensed summaries of condensed summaries.

15. A system, comprising:
a processor configured to:
obtain a history of conversation turns;
provide to an artificial intelligence (AI) language model a prompt and the history of conversation turns, wherein the history of conversation turns includes one or more summaries summarizing a plurality of the conversation turns;
receive a response from the AI language model;
determine one or more turns of the history of conversation turns have been deleted;
determine which of the one or more summaries are associated with the one or more deleted turns;
delete the one or more determined summaries; and
regenerate the one or more deleted summaries based on a current version of a conversation; and
a memory coupled to the processor and configured to provide the processor with instructions.

16. The system of claim 15, wherein the processor is further configured to provide the response from the AI language model to a client device.

17. The system of claim 15, wherein the processor is further configured to:
determine a length of the history of conversation turns; and
generate a summary of some or all of the conversation turns in response to determining the length of the history of conversation turns is greater than a conversation threshold.

18. The system of claim 17, wherein the conversation threshold is a particular number of turns or a particular number of tokens.

19. A computer program product embodied in a non-transitory computer readable medium and comprising computer instructions for:
obtaining a history of conversation turns;
providing to an artificial intelligence (AI) language model a prompt and the history of conversation turns, wherein the history of conversation turns includes one or more summaries summarizing a plurality of the conversation turns;
receiving a response from the AI language model;
determining one or more turns of the history of conversation turns have been deleted;
determining which of the one or more summaries are associated with the one or more deleted turns;
deleting the one or more determined summaries; and
regenerating the one or more deleted summaries based on a current version of a conversation.

* * * * *